US012385693B2

(12) United States Patent
Graziel et al.

(10) Patent No.: US 12,385,693 B2
(45) Date of Patent: Aug. 12, 2025

(54) METHOD FOR DRYING A SUBSTRATE AND AIR-DRYING MODULE AND DRYING SYSTEM

(71) Applicant: Excelitas Noblelight GmbH, Hanau (DE)

(72) Inventors: Bernhard Graziel, Hanau (DE); Michael Tittmann, Hanau (DE); Jens Büngener, Hanau (DE); Vincent Krafft, Hanau (DE); Larisa Von Riewel, Hanau (DE)

(73) Assignee: Excelitas Noblelight GmbH, Hanau (DE)

( * ) Notice: Subject to any disclaimer, the term of this patent is extended or adjusted under 35 U.S.C. 154(b) by 1221 days.

(21) Appl. No.: 17/050,310

(22) PCT Filed: Apr. 25, 2019

(86) PCT No.: PCT/EP2019/060582
§ 371 (c)(1),
(2) Date: Oct. 23, 2020

(87) PCT Pub. No.: WO2019/211155
PCT Pub. Date: Nov. 7, 2019

(65) Prior Publication Data

US 2021/0080177 A1 Mar. 18, 2021

(30) Foreign Application Priority Data

May 4, 2018 (DE) ......................... 102018110824.9

(51) Int. Cl.

| | |
|---|---|
| ***F26B 3/28*** | (2006.01) |
| ***F26B 13/20*** | (2006.01) |
| ***F26B 21/00*** | (2006.01) |

(52) U.S. Cl.
CPC ............ *F26B 3/283* (2013.01); *F26B 13/104* (2013.01); *F26B 21/004* (2013.01)

(58) Field of Classification Search
CPC .... F26B 3/283; F26B 3/04; F26B 3/30; F26B 15/00; F26B 21/004; F26B 25/005; (Continued)

(56) References Cited

U.S. PATENT DOCUMENTS 4,146,974 A * 4/1979 Pray ........................ F26B 3/283 34/571
5,606,805 A * 3/1997 Meyer ................... F26B 13/104 34/267
(Continued)

FOREIGN PATENT DOCUMENTS

CA 2748263 11/2014
DE 2203621 8/1973
(Continued)

OTHER PUBLICATIONS

German Office Action dated Aug. 1, 2019 in corresponding German Patent Application No. 102018110824.9.
(Continued)

*Primary Examiner* — Edelmira Bosques
*Assistant Examiner* — Bao D Nguyen
(74) *Attorney, Agent, or Firm* — Wolf, Greenfield & Sacks, P.C.

(57) ABSTRACT

A method for at least partially drying a substrate. The method includes: (a) directing a supply air flow onto the substrate with a direction component in either the transport direction, or the opposite direction and (b) directing an exhaust air flow away from the substrate. The method is reproducible and effective and achieves an improved result with respect to the homogeneity and speed of drying because the exhaust air flow is split into a plurality of sub-flows by
(Continued)

supplying each of the sub-flows to an individual intake channel, and because, in the event of a supply air flow in the transport direction of movement of the substrate, the supply air flow is arranged spatially upstream of the exhaust air flow and, in the event of a supply air flow in the opposite direction, the supply air flow is arranged spatially downstream of the exhaust air flow.

19 Claims, 2 Drawing Sheets

(58) Field of Classification Search
CPC ................ F26B 13/104; B41F 23/0413; B41F 23/0436; B41F 23/0456
See application file for complete search history.

(56) References Cited

U.S. PATENT DOCUMENTS 5,867,920 A * 2/1999 Rogne .................. F26B 13/104 34/267
5,901,462 A * 5/1999 Rudd .................... F26B 13/145 34/124
6,289,603 B1 9/2001 Lescanne et al.

FOREIGN PATENT DOCUMENTS

| | | | |
|---|---|---|---|
| DE | 102010046756 | 3/2012 | |
| DE | 102016112122 | 6/2017 | |
| EP | 1030149 | 2/2000 | |
| JP | 2014129909 A | 7/2014 | |
| WO | 2000058551 | 10/2000 | |
| WO | 2001002643 | 1/2001 | |
| WO | 2004072552 | 8/2004 | |
| WO | 2010090690 | 8/2010 | |
| WO | WO-2013172777 A1 * | 11/2013 | ............... D21C 9/18 |

OTHER PUBLICATIONS

International Search Report and Written Opinion dated Jul. 30, 2019 for corresponding International Patent Application No. PCT/EP2019/060582.
Office Action issued Mar. 3, 2023 in JP Patent Application No. 2020-561699.

* cited by examiner

METHOD FOR DRYING A SUBSTRATE AND AIR-DRYING MODULE AND DRYING SYSTEM

CROSS-REFERENCE TO RELATED APPLICATIONS

This application is a U.S. National Phase filing of international patent application number PCT/EP2019/060582, filed on Apr. 25, 2019 that claims priority to German patent application no. 10 2018 110 824.9, filed on May 4, 2018, the entireties of which are incorporated herein by reference.

TECHNICAL FIELD

The invention relates to a method for at least partially drying a substrate, to an air dryer module for drying a substrate moving through a drying space in a transport direction, and to an infrared dryer system for drying a substrate moving through a process space in a transport direction.

BACKGROUND ART

Offset printing machines, lithographic printing machines, rotary printing machines or flexographic printing machines are commonly used for printing sheet- or web-type print substrates made of paper, paperboard, film or cardboard with printing inks.

Typical ingredients of printing inks and printer inks are oils, resins, water and binders. For solvent-based, and especially for water-based, printing inks and lacquers, drying is necessary, which can be based on both physical and chemical drying processes. Physical drying processes comprise the evaporation of solvents (in particular water) and the diffusion of solvents into the print substrate. Chemical drying is understood to mean the oxidation or polymerization of printing ink ingredients.

Conventional infrared dryer systems have other functional components besides infrared lamps, such as cooling, supply air and exhaust air, which are linked together in various ways and controlled in an air management system. Thus, for example, DE 10 2010 046 756 A1 describes a dryer module and a dryer system for printing machines composed of a plurality of dryer modules for printing sheet or roll material.

The dryer system consists of a plurality of infrared dryer modules arranged transverse to the transport direction, each of which has an elongated infrared lamp aligned with the print substrate to be dried, the longitudinal axis of the lamp running perpendicular to the transport direction of the print substrate. Using a controllable ventilation system, an air flow is generated, which acts on the infrared lamp and on the print substrate. The infrared lamp is arranged within a process space for the print substrate. The supply air is fed to a supply air collection space and heated in the space using a heating device.

In addition, the air that has been heated by the infrared lamp is removed using a fan and added to the heated supply air, thus cooling the infrared lamp.

From the supply air collection space, the heated supply air passes into the process space via gas outlet nozzles in the form of slit nozzles. The gas outlet nozzles are arranged on either side of the infrared lamp, with the front slit nozzle in the transport direction of the print substrate running obliquely to the print substrate plane with an orientation against the transport direction, and the rear slit nozzle in the transport direction likewise running obliquely to the print substrate plane with an orientation in the transport direction. The degree of inclination of the slit nozzles can be varied using a motor.

From the process space, the moisture-laden supply air is removed as exhaust air via an intake channel and part of it is fed to a heat exchanger and another part is added to the supply air collection space.

In the known infrared dryer module, the process gas is heated using a heating device provided specifically for that purpose. The heated process gas issues towards the print substrate as a heated air flow, acting locally and otherwise in a more or less undefined manner on the print substrate to be dried until it is extracted again at another location as moisture-laden air. The effectiveness of the drying air in terms of transporting moisture away from the substrate surface is therefore not precisely reproducible.

CA 2 748 263 C describes a method and a device for drying that use heated air flow and ultrasound. The ultrasound transducers used for this purpose generate ultrasound waves with a power level in the range of 120 to 190 dB at the boundary layer of the material to be dried and thus contribute to breaking down a diffusion boundary layer. In one embodiment, the ultrasound transducers are executed with compressed air assistance, wherein a casing is employed having a central air outlet, which has on each side an obliquely positioned compressed air outlet with an additional ultrasound transducer and two return air inlets.

From WO 01/02643 A1, a nozzle arrangement in an airborne web drying device for drying a coated paper web is known, in which an overpressure nozzle is arranged such that it blows drying air both in the travel direction and against the travel direction of the web. The nozzle arrangement further comprises a direct impingement nozzle, which is combined with the overpressure nozzle, wherein a plurality of nozzle slots are formed in the direct impingement nozzle in order to blow drying air mainly perpendicularly toward the web. When a plurality of nozzle arrangements arranged one after another in the transport direction of the paper web are used, a common discharge passage is located between each two adjacent nozzle arrangements for discharging the exhaust air.

DE 10 2016 112 122 A1 describes an LED (light emitting diode) hardening device for UV (ultraviolet) printing inks, comprising an LED light substrate having a cooler and a casing. A partition wall extends from the upper end of the cooler of the LED light substrate to an upper wall of the casing, the partition wall dividing the interior of the casing on either side of the LED light substrate into a gas intake chamber having a plurality of gas intake holes and a gas exhaust chamber having a plurality of gas exhaust holes. Both the gas intake holes and the gas exhaust holes are positioned obliquely such that they form an angle of 45° with the vertical midline of the LED light substrate.

SUMMARY OF THE DISCLOSURE

The present invention is therefore based on the object of specifying a drying method that is reproducible and effective and leads to an improved result, particularly in terms of homogeneity and speed of drying of the substrate. In addition, the invention is based on the object of providing an energy-efficient air dryer module and an infrared dryer system which are improved in terms of homogeneity and speed of drying, in particular for drying solvent-containing, and in particular water-based, dispersions.

With regard to the method, this object is achieved according to the invention, starting from a method of the type mentioned above, in that the exhaust air flow is split into a plurality of sub-flows by supplying each of the sub-flows to an individual intake channel, and in that, in the case of a supply air flow having a direction component in the direction of movement of the substrate, the supply air flow is arranged spatially upstream of the exhaust air flow and, in the case of a supply air flow having a direction component in the opposite direction to the movement of the substrate, the supply air flow is arranged spatially downstream of the exhaust air flow.

The supply air flow is not diffuse, but has a main propagation direction in which it advances on to the substrate surface according to the air volume and the flow rate, and impinges on the surface at a predetermined angle and acts on the coated substrate in a drying manner. By "predetermined" is meant determined beforehand, so that the predetermined characteristic must be determined, i.e., chosen or at least known, in advance of some event. "Acting" means that the supply air flow dries the substrate, e.g., in that solvents are taken up from the surface layer into the gaseous phase. The main propagation direction of the supply air flow preferably forms an angle of between 10 and 85 degrees with the surface of the substrate.

Each supply air flow that is directed onto the substrate has an exhaust air flow leading away from the substrate and split into a plurality of sub-flows that are spatially assigned thereto, via which exhaust air flow the moisture-laden process gas and other gaseous components issuing from the substrate are completely or partially removed from a drying space as exhaust air. The flow of the exhaust air is generated by extraction via an intake channel.

The drying method according to the invention is distinguished in particular by the combination of the following aspects:

(i) The flow boundary layers that are entrained and caught on the moving substrate are broken through by the supply air flow directed onto the substrate surface. In particular, water that has evaporated in an upstream heating process is carried away with the supply air flow and removed from the substrate. The breaking through of the flow boundary layers is most successful when the supply air flow direction has a main propagation direction with a direction component in the direction of movement of the substrate or in the opposite direction, i.e., running obliquely to the substrate surface. Preferably, the angle of inclination between the main propagation direction of the supply air flow and the substrate surface is between 10 and 85 degrees. This causes a disturbance, reduction or even separation of the fluid-dynamic laminar flow boundary layer and an associated improvement in the mass transfer and, in particular, in the removal of moisture from the substrate.

In the case of a supply air flow issuing obliquely in the transport direction, the supply air flow impinges on the substrate with an impact speed that is reduced by the speed of movement of the substrate. In the other case, the speed vectors of the supply air flow and substrate movement are added together to give the impact speed.

(ii) The supply air flow that runs obliquely to the substrate surface has an extraction system assigned to the supply air flow which, depending on the transport direction of the substrate, is situated either spatially upstream or spatially downstream of the location of the supply air flow. The supply air flow running obliquely to the substrate surface therefore always points towards the exhaust air flow. The spatial assignment of the supply air flow and the exhaust air flow causes a mutual interaction between the respective air flows on the substrate surface and ensures that the air of the flow boundary layer that is broken up by the supply air flow can be directly extracted.

In the case of a supply air flow having a direction component in the opposite direction to the movement of the substrate, the supply air flow is arranged spatially downstream of the exhaust air flow. As a result, and because the supply air flow direction runs obliquely to the substrate surface, however, there is a risk of vortex formation. The direction of rotation of the air vortex that forms in this case is determined by the oblique orientation of the supply air flow direction and runs clockwise in the present case.

In the other case, with a supply air flow having a direction component in the direction of movement of the substrate, the supply air flow is arranged spatially upstream of the exhaust air flow and there is a risk of vortex formation in the exhaust air flow with a counter clockwise direction of rotation.

(iii) A distinct vortex formation leads to a local stabilizing and binding of the swirling air, accompanied by so-called dead zones with low exchange of air, which makes effective extraction difficult. The invention therefore provides that the exhaust air flow is split into a plurality of sub-flows by supplying each of the sub-flows to an individual intake channel. Precisely one intake channel is allocated to each sub-flow, each sub-flow is extracted via precisely one intake channel.

It has been shown that vortex formation can be reduced by splitting the exhaust air flow into a plurality of sub-flows. A forming air vortex is channeled in the intake channels and at least partially dissipated thereby. This allows effective and energy-saving extraction and a reduction in air consumption.

In the method according to the invention, thanks to these measures, rapid and effective drying of the substrate is achieved together with low energy consumption. In addition, by controlling the volumes of supply air and exhaust air, the degree of gas turbulence is controllable and thus the effectiveness of drying can be adjusted reproducibly.

By splitting the exhaust air flow, the formation of zones with low air exchange in a distinct exhaust air flow vortex is counteracted. It has proved advantageous if the exhaust air flow is split into at least three sub-flows.

At the local positions in the drying space at which the splitting of the exhaust air flow occurs, sub-flows are separated from the "exhaust air flow vortex." In the preferred case, these positions are located where the exhaust air flow vortex would otherwise form in a distinct manner.

In view of the above, it has proved favorable if the intake channels each have an intake channel suction opening facing a drying space, with adjacent suction openings varying in their position and orientation in the drying space. As a result, sub-flows are extracted from the "exhaust air flow vortex" at different positions and in different directions.

From a design point of view, this result is preferably accomplished by delimiting and defining the suction openings by air baffles projecting into the drying space. By the position and orientation of the air baffles, intake openings are defined and sub-flows are separated from the exhaust air flow vortex and a new flow direction is imposed on them, which will be referred to below as the "inflow direction" of the particular sub-flow.

Each of the suction openings defines its own inflow direction, the suction openings preferably being oriented such that their respective intake directions differ from one another. With a view to effective drying, it has proved advantageous if a plurality of suction openings, particularly preferably all the suction openings, are oriented such that their individual inflow direction and the main propagation direction of the supply air flow run in approximately opposite directions, i.e., form an angle of between 0 and 45 degrees, for example.

In a particularly preferred method variant, the supply air flow exits a longitudinal slit-shaped nozzle opening and acts on the substrate to be dried in a strip-shaped manner, and the exhaust air flow is removed via a plurality of slit-shaped intake channels.

The drying air streams out from a slit-shaped inlet opening into the drying space towards the substrate surface. The slit-shaped inlet opening is designed as a through-gap, for example, or as a sequence of a plurality of individual openings. It acts on the substrate to be dried in a strip-shaped surface region. The intake channels may optionally also be slit-shaped and thus the exhaust air sub-flows may also each be preferably formed in a strip shape and removed by a corresponding number of slit-shaped intake channels. Thus, a plurality of parallel strip-shaped exhaust air sub-flows are preferably spatially assigned to the strip-shaped supply air flow.

The drying space is arranged transverse to the substrate travel direction and extends over the entire width of the substrate moving under the drying space. Thus, the entire width of the substrate can be treated and dried homogeneously by the dynamically acting air.

A particularly advantageous embodiment of the method according to the invention is distinguished by the fact that, using a process gas quantity control system, the gas volume $V_{in}$ introduced into the drying space is adjusted so as to be smaller than the gas volume $V_{out}$ extracted from the dryer module, wherein the following mathematical relationship preferably applies: $1.2 \times V_{in} < V_{out} < 1.5 \times V_{in}$.

With the aid of simulations, it has been shown that high flow velocities of the exhaust air flow would be generated in a distinct air vortex within the drying space, which can lead to a significant quantity of exhaust air escaping via the entry and exit sides of the substrate, and this can lead to problems in the upstream process step and/or to contaminations of the environment.

As a consequence of splitting the exhaust air flow into sub-flows, the formation of a distinct air vortex within the drying space is avoided, as explained above. Instead of allowing the drying air to escape from the drying space, there is preferably a slight tendency for it to be sucked into the drying space. The air balance between the exhaust air flow on the one hand and the quantities of air flowing into the drying space via the supply air flow and on the substrate entry and exit sides is preferably adjusted such that a volume ratio of between 1.2 and 1.5 is obtained. Ideally, this prevents any drying air from escaping from the drying space to the outside. The dryer module has an outwardly neutral effect in terms of air circulation, which means that the environment is not contaminated by hot, moisture-laden air escaping, the module is pneumatically sealed.

With regard to the air dryer module, the above-mentioned object is achieved, starting from an air module of the type according to the invention mentioned at the beginning, by the fact that the exhaust air unit comprises a plurality of intake channels so that the exhaust air flow is split into a plurality of sub-flows, and in that the supply air nozzle has a nozzle opening that faces towards the exhaust air unit.

Through the supply air nozzle, the supply air flow issues obliquely towards the substrate surface. The nozzle opening of the supply air nozzle therefore points towards the substrate surface and at the same time it points towards the exhaust air unit.

In the drying space, the partial drying of the substrate and the air exchange between supply air and exhaust air take place. The aim is to keep the drying space as small as possible and to avoid an escape of air from the drying space as far as possible.

The drying module according to the invention is distinguished, in particular, by the combination of the following aspects:

(i) The flow boundary layers that are entrained and caught on the moving substrate are broken through by the supply air flow directed onto the substrate surface. The breaking through of the flow boundary layers is most successful when the supply air flow issuing from the nozzle has a main propagation direction that forms an angle of between 10 and 85 degrees with the substrate surface. The effective breaking through of the flow boundary layers makes it possible to keep the drying space compact. Thus, for example, in the case of a slit-shaped supply air nozzle with a nozzle longitudinal axis running in the direction of the supply air flow, the longitudinal axis forms an angle of between 30 and 90 degrees with the surface of the substrate.

(ii) The supply air flow has an exhaust air unit allocated to it which, depending on the transport direction of the substrate, is situated either spatially upstream or spatially downstream of the location of the supply air flow. In each case, the nozzle opening of the supply air nozzle points towards the exhaust air unit (and not away from the exhaust air unit). The supply air flow that exits obliquely to the substrate surface thus always has a direction component towards the exhaust air unit.

In the case of a supply air flow having a direction component in the opposite direction to the movement of the substrate, the drying module is oriented such that the supply air unit is arranged spatially downstream of the exhaust air unit. In the other case, with a supply air flow having a direction component in the direction of movement of the substrate, the drying module is oriented such that the supply air unit is arranged spatially upstream of the exhaust air unit.

(iii) To impede a distinct vortex formation and thus a local stabilizing and binding of the swirling air in the drying space, the exhaust air unit comprises a plurality of intake channels, by which the exhaust air flow is split into a plurality of sub-flows, preferably into at least three sub-flows, by supplying each of the sub-flows to an individual intake channel. Precisely one intake channel is allocated to each sub-flow, each sub-flow is extracted via precisely one intake channel.

It has been shown that vortex formation can be reduced by splitting the exhaust air flow into a plurality of sub-flows. As a result, effective and energy-saving extraction can be achieved within a small drying space volume, and the air consumption decreases. The air dryer module according to the invention is therefore suitable for use in the method according to the invention.

The division of the exhaust air unit into intake channels is preferably achieved from a design point of view in that air baffles project into the drying space, which delimit and define at least some of the suction openings of the extraction channels.

By the position and orientation of the air baffles, the sub-flows are separated at different points in the drying space. Each of the intake openings is defined by an individual surface normal, wherein the directions of the surface normals can differ from one another. It has proved expedient if each individual surface normal forms an angle of between 90 and 200 degrees with the supply air flow direction.

This configuration means that each suction opening is oriented such that the inflow direction of each sub-flow of the exhaust air flow and the supply air flow direction run in almost opposite directions.

In a particularly preferred embodiment of the air dryer module according to the invention, it comprises an air supply box in which the supply air unit and the exhaust air unit are integrated.

In the air supply box, to that end, for example the supply air unit comprising a supply air chamber with a supply air connection and the supply air nozzle, and the exhaust air unit comprising an extraction chamber with an exhaust air connection and the intake channels, are assembled such that they form an independent component that can be inserted into equipment for substrate processing as a drying module without the need for other regions of the equipment to undergo design modifications for this purpose. The air supply box can furthermore contain a fan, which should be allocated to the supply air unit or the exhaust air unit. The lateral dimension of the air supply box—viewed in the transport direction of the substrate—in preferred embodiments is less than 100 mm.

In a further advantageous embodiment of the air dryer module according to the invention, the drying space is delimited by a first surface, in which the supply air nozzle is formed, by a second surface, in which the intake channels are formed, and by the substrate.

The drying space in this case is substantially delimited by three surfaces and has an approximately triangular shape, viewed in a cross-section along the substrate transport direction. It facilitates an air circulation in which the supply air flowing out of the supply air nozzle can rise again after contacting the substrate, with the initial formation of a partial vortex, where it can be efficiently captured and extracted by the intake channels. In the dryer module according to the invention, thanks to this measure, rapid and effective drying of the substrate can be achieved together with low energy consumption. In view of the efficient air management, the air module represents a compact dryer unit which saves space in the machine. The distance between the supply air nozzle and the surface of the substrate can preferably be adjusted to less than 10 mm.

The dryer module according to the invention can be a component of a dryer system in which a plurality of identical or different dryer modules are assembled.

With regard to the dryer system for drying a substrate moving through a process space in a transport direction, the above-mentioned technical problem according to the invention is solved in that the front and/or rear air exchanger units each contain at least one air dryer module according to the invention.

The dryer system according to the invention is designed, e.g., as an infrared dryer module, in which the actual process space comprises an irradiation chamber equipped with one or more infrared lamps. The actual process space, e.g., the irradiation chamber, is delimited by at least one air dryer module according to the invention. In a particularly preferred embodiment, the actual process space is delimited by a plurality of air dryer modules according to the invention, which can be arranged one beside the other and/or one behind the other in the transport direction. Preferably, three air dryer modules are arranged one behind the other in the transport direction.

In each rear dryer module arranged downstream of the process chamber in the transport direction, the air flow from the nozzle is directed against the transport direction of the substrate. In each front dryer module arranged upstream of the process chamber in the transport direction, the direction of the air flow from the nozzle matches the transport direction of the substrate.

The front and rear air dryer modules at the entrance and exit of the dryer system, in addition to the functions of separating the flow boundary layer and drying the substrate, function as air curtains and thus seal the dryer system pneumatically against the outside. The interaction of the irradiation chamber with the air dryer modules reduces the risk of contamination, and in particular water, entering the process space and outgassing from the dryer system. This achieves a particularly low water content in the process space and improves and optimizes the drying effect.

DEFINITIONS

"Supply air," in the simplest case, is the air taken from the atmosphere. It can also comprise synthetically produced gases and gas mixtures that are capable of physically absorbing water. It can also contain reactive substances for the chemical drying of the substrate. To improve drying efficiency, the supply air is preferably preheated to a temperature in the range of between 7° and 90° C.

By way of the "intake channels," the exhaust air flows out of the drying space. A "suction opening" of an intake channel is understood to mean the surface delimited by a channel edge, through which the exhaust air that has been sucked in enters the intake channel. The intake channels can lead to a common extraction chamber.

The terms "arranged spatially downstream" and "arranged spatially upstream" relate to the arrangement as viewed in the transport direction of the substrate.

A supply air flow having a direction component in the substrate transport direction has a main propagation direction with a direction component in the substrate transport direction. Accordingly, a supply air flow having a direction component greater than zero against the substrate transport direction is one whose main propagation direction has a direction component greater than zero against the substrate transport direction. The main propagation direction is the flow direction of the supply air flow (not yet affected by the flow conditions in the drying space) imposed directly after entering the drying space. In the embodiment shown schematically in FIG. 2, the direction is given by the longitudinal axis 25*a* of the supply air outlet nozzle 25.

It is to be understood that both the foregoing general description and the following detailed description are exemplary, but are not restrictive, of the disclosure.

BRIEF DESCRIPTION OF THE DRAWING

The invention will be explained in more detail below with reference to exemplary embodiments and a patent drawing. The individual figures that comprise the drawing show the following schematic illustrations.

EXEMPLARY EMBODIMENTS

The invention relates to a method for at least partially drying a substrate, comprising the method steps of:

(a) generating a supply air flow directed onto the substrate, the supply air flow having a supply air flow direction with a direction component in the transport direction or in the opposite direction, and (b) generating an exhaust air flow leading away from the substrate.

In addition, the invention relates to an air dryer module for drying a substrate moving through a drying space in a transport direction, comprising:

(a) a supply air unit including a supply air nozzle for generating a supply air flow directed onto the substrate and having a main propagation direction that forms an angle of between 10 and 85 degrees with the surface of the substrate, and (b) an exhaust air unit for generating an exhaust air flow leading away from the substrate out of the drying space.

Moreover, the invention involves an infrared dryer system for drying a substrate moving through a process space in a transport direction, comprising an infrared dryer module having a sequence of the following components, viewed in the substrate transport direction: a front air exchanger unit, an irradiation space equipped with a plurality of infrared lamps arranged parallel to one another, and a rear air exchanger unit.

Such air dryer modules and drying methods are employed, e.g., for drying water-based dispersions, inks, paints, lacquers, adhesives or other solvent-based layers on substrates or for drying moist material webs made of non-woven material and other textile materials. Infrared dryer systems are used in particular for drying printed products such as paper and paperboard and products made of paper and paperboard.

Figure 4:
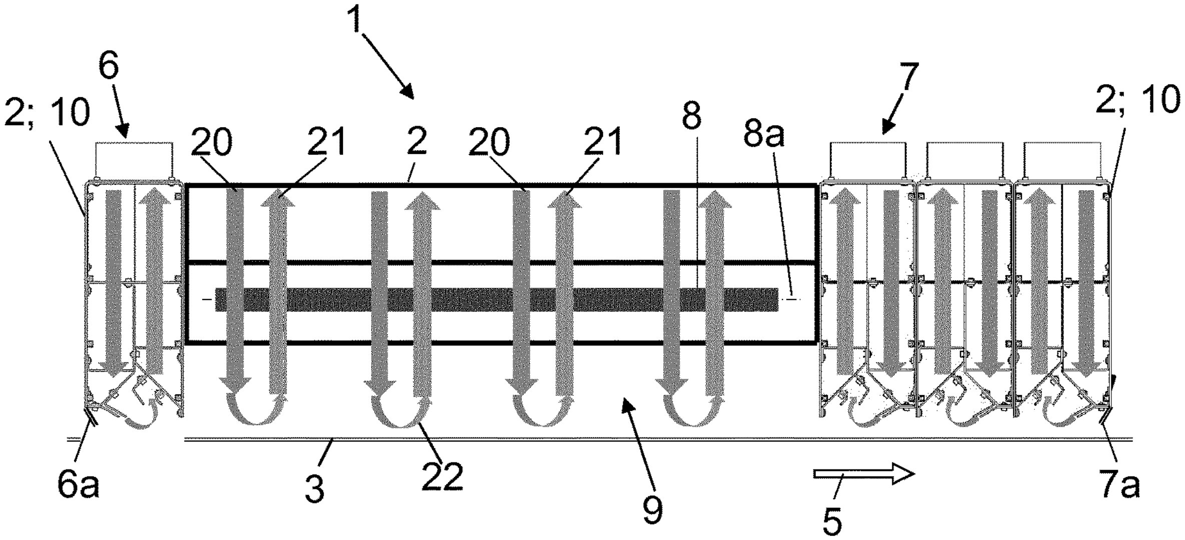
FIG. 4 illustrates an infrared dryer module equipped with air exchanger units (or air dryer modules) according to the invention in a longitudinal section in the print substrate transport direction.

In the embodiment of an infrared dryer module 1 shown schematically in FIG. 4, a casing 2 surrounds a treatment space (or a process space) for a print substrate 3 having the following components viewed in the transport direction 5: a front air exchanger unit 6 with its own casing 10 and an additional air baffle 6*a*, an infrared irradiation chamber 9 fitted with eighteen infrared lamps 8, whose longitudinal axes 8*a* run approximately in the transport direction 5 and which are arranged parallel to one another, and a rear air exchanger unit 7 with its own casing 10. The directional arrows 20 that are marked in the irradiation chamber 9 indicate an air flow directed onto the surface of the print substrate 3 and the directional arrows 21 indicate an air flow leading away from the print substrate 3, as well as a mutual interaction 22 between these air flows.

In a dryer system, for example a plurality of the infrared dryer modules 1 are arranged in pairs one beside the other and one behind the other, viewed in the transport direction 5. Each pair of infrared dryer modules 1 arranged one beside the other covers the maximum format width of a printing machine. According to the dimensions and color assignment of the print substrate 3, the infrared dryer modules 1 and the individual infrared lamps 8 can be separately electrically controlled.

The air exchanger units 6; 7 are each equipped with their own casing 10 and are inserted releasably in the casing 2 of the infrared dryer module 1. The air exchanger units 6; 7 are of identical construction; however, in the air exchanger unit 6 the supply air side is upstream of the exhaust air side and in the air exchanger unit 7 it is the other way around. At the exit of the infrared dryer module 1, three air exchanger units 7 are assembled in a group, and the last air exchanger unit 7 is provided with a closing air baffle 7*a*. The air exchanger units 6; 7 at the same time form air dryer modules within the meaning of the invention. They will be explained in more detail below with reference to FIGS. 1 to 3. Where the same reference numerals are used in these figures as in FIG. 4, they denote components and parts identical or equivalent to those explained above with reference to the description of the infrared dryer module 1.

Figure 1:
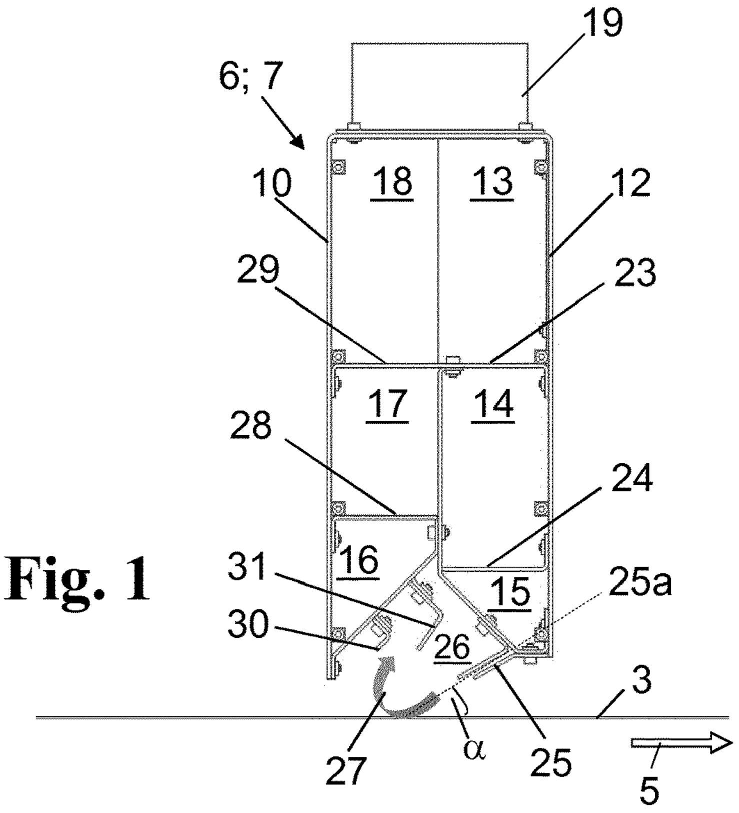
FIG. 1 illustrates an embodiment of the air dryer module according to the invention in a cross-section along the transport direction of a substrate to be treated.

The cross-section of an individual air dryer module 6 shown in FIG. 1 comprises a box-like casing divided into two sections 10; 12, which encompasses an upper supply air chamber 13, a middle supply air chamber 14 and a lower supply air chamber 15 on a supply air line (supply air channel), and encompasses a lower exhaust air chamber 16, a middle exhaust air chamber 17 and an upper exhaust air chamber 18 on an exhaust air line (intake channel).

Figure 2:
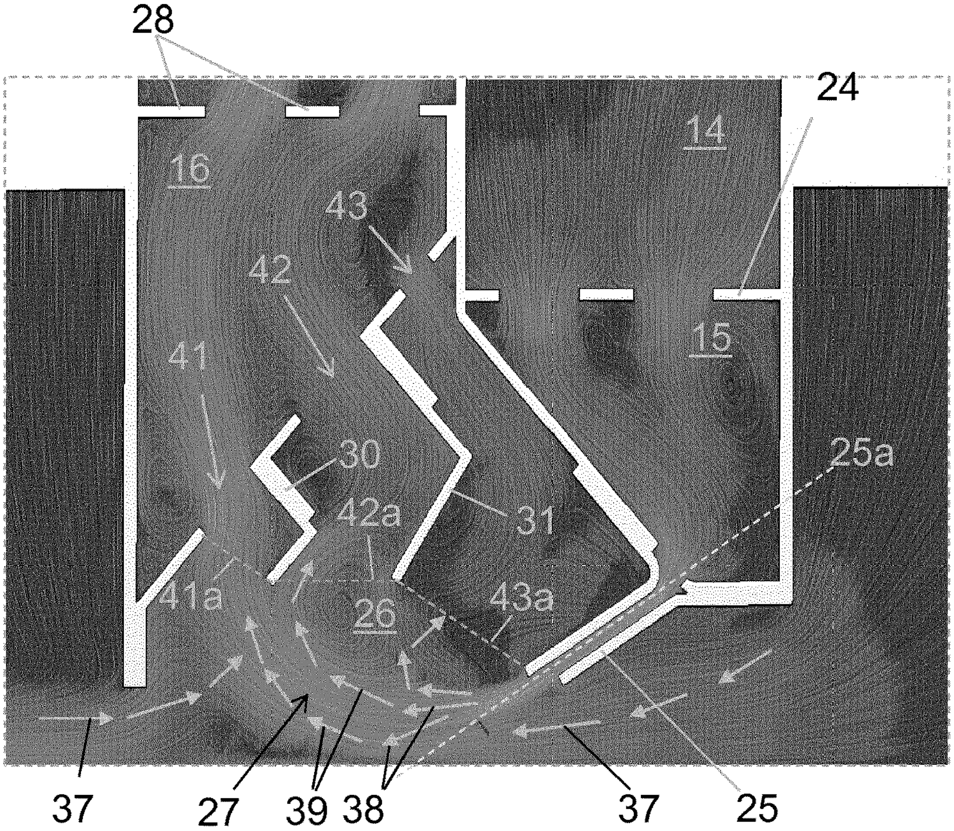
FIG. 2 illustrates a cutout of the air dryer module with details of the flow behavior inside the drying space.

The upper supply air chamber 13 is connected to a fan 19, which introduces dry supply air into the supply air line in a controlled manner with the volume $V_{in}$. Likewise, the upper exhaust air chamber 18 is connected to a fan (not illustrated in the figure), which removes the moist exhaust air from the exhaust air line in a controlled manner with the volume $V_{out}$. The process gas quantity control for the dryer module 6; 7 is designed such that $1.2\times V_{in}<V_{out}<1.5\times V_{in}$. This means that the dryer module 6; 7 is pneumatically neutral in the sense that, nominally, it does not release any other volume of gas to the environment apart from via the extraction system. On the contrary, a certain volume of extraneous air (about 20 to 50%, based on the supply air volume) is sucked into the drying module. The effect of the inflowing extraneous air is indicated in FIG. 2 with the aid of the flow arrows 37.

Between the upper and middle supply air chambers 13; 14 a front perforated plate 23 is located, and between the middle and lower supply air chambers 14; 15 a rear perforated plate 24 is located, wherein the front perforated plate 23 has a first number N1 of supply air through-openings, having a first mean opening cross-section A1, and wherein the rear perforated plate 24 is provided with a second number N2 of supply air through-openings, which are uniformly distributed over the rear perforated plate 24 and which have a second mean opening cross-section A2, wherein N2>N1 and A1>A2. The front perforated plate 23 creates a uniform distribution of the supply air volume along the rear perforated plate 24, which in turn serves to distribute the supply air uniformly along the slit-shaped supply air outlet nozzle 25.

The lower supply air chamber 15 is connected to the slit-shaped supply air outlet nozzle 25, whose longitudinal axis 25*a* forms an angle α of 30 degrees with the surface of the substrate to be dried (i.e., the print substrate 3). By way of the slit-shaped supply air outlet nozzle 25, a supply air stream with a main propagation direction in the direction of the longitudinal axis 25 passes onto the substrate surface and acts on the substrate 3 in a drying manner in a drying space 26.

From the drying space 26, the moisture-laden process air passes into the lower exhaust air chamber 16. Between the lower exhaust air chamber 16 and the middle exhaust air chamber 17 a second front perforated plate 28 is located, and between the middle and upper exhaust air chambers 17; 18 a second rear perforated plate 29 is located, wherein the second front perforated plate 28 has a first number N3 of exhaust air through-openings having a first mean opening cross-section A3, and wherein the second rear perforated plate 29 is provided with a second number N4 of exhaust air through-openings, which are uniformly distributed over the second rear perforated plate 29 and which have a second mean opening cross-section A4, wherein N4>N3 and A3>A4. The perforation in the second front perforated plate 28 is designed such that an internal pressure that is as uniform as possible is obtained over the length of the lower exhaust air chamber 16.

The flow boundary layers that are entrained and caught on the moving substrate 3 are broken through by the supply air flow directed on to the substrate surface. The fact that the supply air flow direction has a direction component in the transport direction 5 of movement of the substrate 3 or in the opposite direction causes a disturbance, reduction or even separation of the fluid-dynamic laminar flow boundary layer and an associated improvement in the mass transfer and in particular in the removal of moisture from the substrate 3 and the drying space 26.

The flow direction of the supply air running obliquely to the substrate 3 (the main propagation direction in the direction of the longitudinal axis 25*a*) is important for this effect, as is a splitting of the exhaust air flow by an extraction system which, depending on the transport direction 5 of the substrate 3, is located either spatially upstream or spatially downstream of the position of the supply air flow. In each case, the supply air flow running obliquely to the substrate surface points towards the exhaust air side. The drying space 26 has a substantially triangular shape in the cross-section illustrated.

FIG. 1 shows the case of a supply air flow having a flow direction component against the transport direction 5 of the substrate 3. As illustrated, the supply air flow is arranged spatially downstream of the exhaust air flow in the transport direction 5. As a consequence of the inflow angle α and the opposite extraction system, a vortex formation of the inflowing and outflowing drying air starts, as indicated by the directional arrow 27. The direction of rotation of the forming air vortex 27 runs clockwise. To prevent a distinct vortex formation, the exhaust air flow is split into a plurality of sub-flows with the aid of air baffles 30; 31. The air baffles 30; 31 are angled in the opposite direction to the direction of rotation of the forming air vortex 27 and form individual intake channels 41; 42; 43 for a total of three sub-flows, as can be seen from FIG. 2.

Vortex formation is reduced by splitting the exhaust air flow into a plurality of sub-flows and an initially forming air vortex 27 is channeled in the intake channels 41, 42, 43. The flow behavior inside the drying space 26 is indicated schematically by the flow arrows 37; 38; 39, with the supply air flowing into the drying space 26 being denoted by the reference numeral 38 and the exhaust air after reversing direction being denoted by the reference numeral 39. The extraneous air flowing in independently thereof is denoted by the reference numeral 37.

The channeling of the exhaust air flow in the intake channels 41; 42; 43 is effected by the angled air baffles 30; 31, which project into the initially and partially forming air vortex 27 at different positions. They define suction openings 41*a*; 42*a*; 43*a* of the intake channels 41; 42; 43 (marked by broken lines in the drawing). Adjacent suction openings 41*a*; 42*a*; 43*a* differ in their position and orientation in the drying space 26. As a result, sub-flows are picked up from the exhaust air flow vortex 27 at different positions and in different directions. Each of the suction openings 41*a*; 42*a*; 43*a* is defined by an individual surface normal. In each case, the surface normal approximately reproduces the inflow direction of the relevant sub-flow into the intake channel 41; 42; 43. The directions of the surface normals and thus the inflow directions differ from each other and form an angle of around 180 degrees+/−30 degrees with the supply air flow direction (the longitudinal axis 25*a*).

The local positions in the drying space 26 at which the splitting of the exhaust air flow takes place are located where the exhaust air vortex 27 would otherwise form in a distinct manner. This air vortex 27 is at least partially dissipated thereby so that, by splitting the exhaust air flow, the formation of a distinct exhaust air vortex 27 is counteracted and effective, energy-saving extraction becomes possible. In the method according to the invention, thanks to these measures, rapid and effective drying of the substrate 3 is achieved together with low energy consumption.

Figure 3:
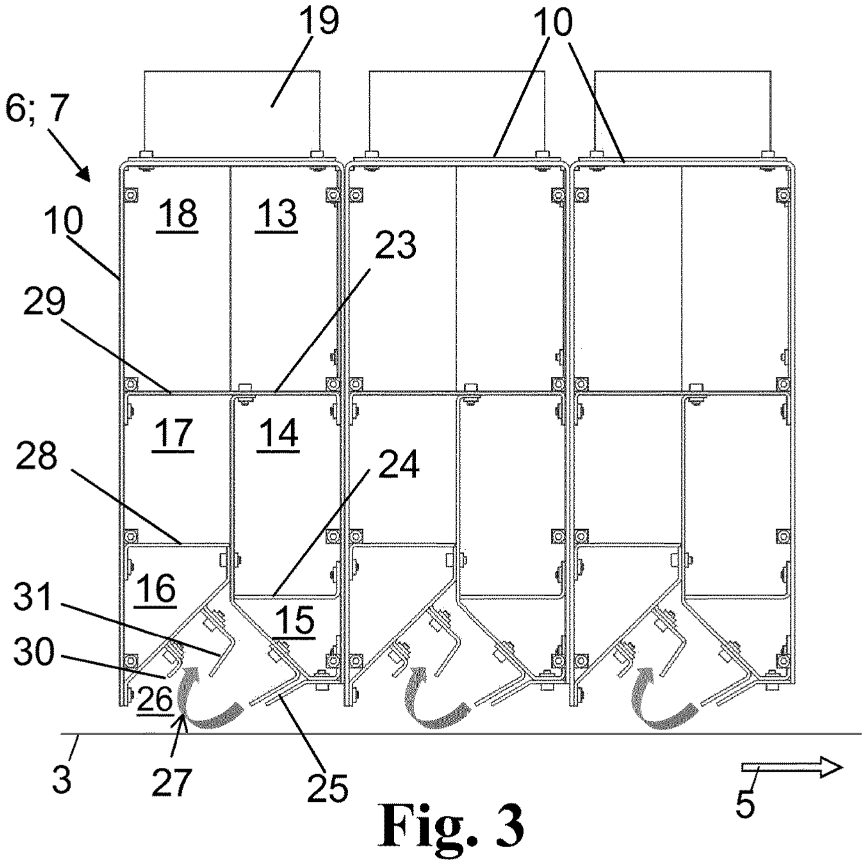
FIG. 3 illustrates a further embodiment of the air dryer module according to the invention in a cross-section along the transport direction of a substrate to be treated.

FIG. 3 is a diagram of a consecutive arrangement of three air dryer modules 7 according to the invention as in FIG. 1. This arrangement is employed, e.g., at the exit of an infrared dryer module 1 according to FIG. 4. As a result, when the print substrate 3 issues from the infrared dryer module 1, as far as possible no toxic or otherwise undesirable substances leave the process space in gaseous and liquid form in an unfiltered and uncontrolled manner.

Although illustrated and described above with reference to certain specific embodiments and examples, the present disclosure is nevertheless not intended to be limited to the details shown. Rather, various modifications may be made in the details within the scope and range of equivalents of the claims and without departing from the spirit of the disclosure. It is expressly intended, for example, that all ranges broadly recited in this document include within their scope all narrower ranges which fall within the broader ranges.

The invention claimed is:

1. A method for at least partially drying a substrate moving in a transport direction, the method comprising:

(a) generating a supply air flow directed on to the substrate, the supply air flow having a supply air flow direction with a direction component in the transport direction or a direction opposite thereto;

(b) splitting an exhaust air flow resulting from the supply air flow into a plurality of sub-flows by supplying each of the sub-flows to an individual intake channel among a set of intake channels;

(c) in a case of the supply air flow having the direction component in the transport direction, arranging the supply air flow and the set of intake channels spatially upstream of one or more drying lamps; and (d) in a case of the supply air flow having the direction component in the direction opposite to the transport direction, arranging the supply air flow and the set of intake A channels spatially downstream of the one or more drying lamps.

2. The method according to claim 1, wherein the exhaust air flow is split into at least three sub-flows.

3. The method according to claim 1, wherein suction openings of each intake channel of each set of intake channels are delimited by air baffles projecting into a drying space, and each suction opening defines an individual inflow direction for an inflowing sub-flow in each case, wherein the inflow directions of adjacent sub-flows differ from one another.

4. The method according to claim 3, wherein the suction openings are oriented such that their individual inflow directions run approximately opposite to a main propagation direction of the supply air flow.

5. The method according to claim 1, wherein the supply air flow flows out of a longitudinal slit-shaped nozzle opening and acts on the substrate to be dried in a strip-shaped manner, and the exhaust air flow is removed via a plurality of slit-shaped intake channels.

6. The method according to claim 1, wherein the supply air flow directed on to the substrate has a main propagation direction that forms an angle of between 10 and 85 degrees with a surface of the substrate.

7. The method according to claim 1, further comprising adjusting a gas volume $V_{in}$ introduced into a drying space so as to be smaller than a gas volume $V_{out}$ extracted from the drying space.

8. The method according to claim 7, wherein $V_{in}$ and $V_{out}$ satisfy the equation $1.2 \times V_{in} < V_{out} < 1.5 \times V_{in}$.

9. An air dryer module for drying a substrate having a surface and moving in a transport direction through a drying space, the module comprising:

(a) a supply air unit including a supply air nozzle for generating a supply air flow directed on to the substrate, the supply air flow having a main propagation direction that forms an angle of between 10 and 85 degrees with the surface of the substrate; and (b) an exhaust air unit generating an exhaust air flow leading away from the substrate out of the drying space, the exhaust air unit including a plurality of intake channels that split the exhaust air flow into a plurality of sub-flows, wherein the supply air unit and the exhaust air unit of the module are both upstream or both downstream of one or more drying lamps according to the transport direction.

10. The air dryer module according to claim 9, wherein the exhaust air unit includes at least three intake channels.

11. The air dryer module according to claim 9, wherein the intake channels include suction openings and the module further comprises air baffles that divide the intake channels, projecting into a drying space, and delimit and define at least part of the suction openings of the intake channels.

12. The air dryer module according to claim 11, wherein the supply air flow has the main propagation direction and the suction openings have individual inflow directions that are oriented such that their individual inflow directions run approximately opposite to the main propagation direction of the supply air flow.

13. The air dryer module according to claim 9, further comprising an air supply box in which the supply air unit and the exhaust air unit are integrated.

14. The air dryer module according to claim 9, wherein a distance between the supply air nozzle and the surface of the substrate is less than 10 mm.

15. The air dryer module according to claim 9, further comprising a first surface in which the supply air nozzle is formed and a second surface in which the intake channels are formed, wherein a drying space is delimited by the first surface, by the second surface, and by the substrate.

16. A dryer system for drying a substrate moving through a process space in a substrate transport direction, comprising an infrared dryer module, having a sequence of following components, viewed in the substrate transport direction:

a front air exchanger unit;

an irradiation space fitted with a plurality of infrared lamps arranged parallel to one another; and a rear air exchanger unit, wherein the front and/or rear air exchanger unit contains at least one air dryer module according to claim 9.

17. The dryer system according to claim 16, wherein the rear and/or the front air exchanger unit comprises a plurality of air dryer modules arranged one beside the other and/or one behind the other.

18. The dryer system according to claim 17, wherein at least one air dryer module is arranged upstream of the irradiation space and at least one air dryer module is arranged downstream of the irradiation space.

19. The dryer system according to claim 16, wherein at least one air dryer module is arranged upstream of the irradiation space and at least one air dryer module is arranged downstream of the irradiation space.

* * * * *